June 10, 1941.    K. JANN ET AL    2,245,478
GYROSCOPIC INSTRUMENT
Filed June 30, 1939
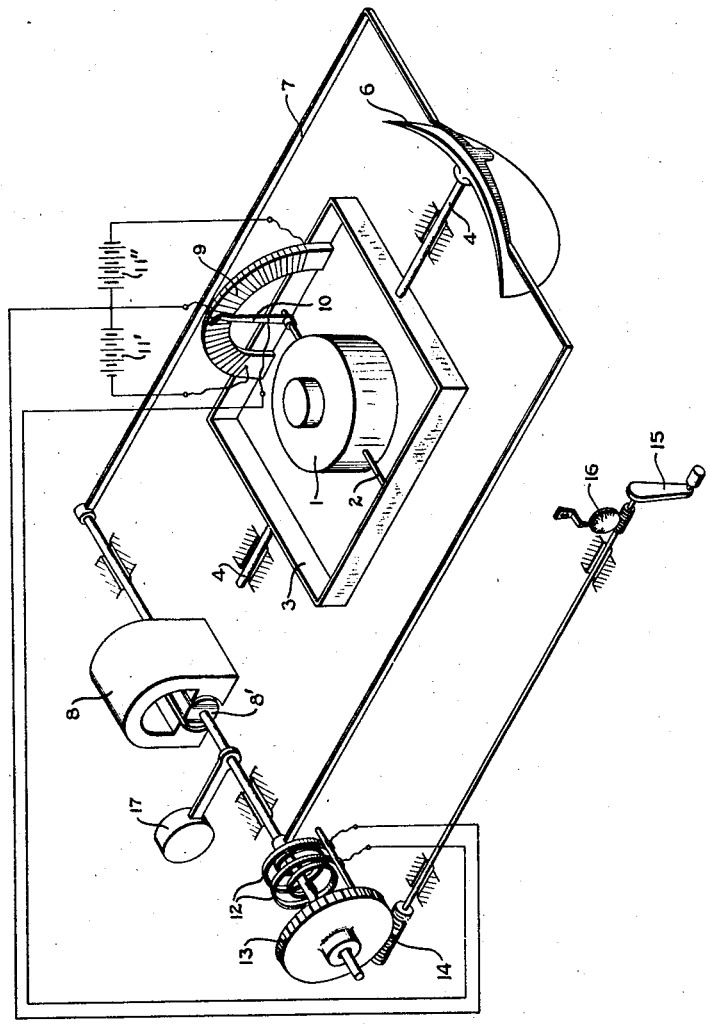
INVENTORS
Kurt Jann
and Heinrich Roland,
BY
Stephen Cerstvik
ATTORNEY.

Patented June 10, 1941

2,245,478

UNITED STATES PATENT OFFICE 2,245,478

GYROSCOPIC INSTRUMENT

Kurt Jann, Berlin-Charlottenburg, and Heinrich Roland, Berlin-Steglitz, Germany, assignors to Siemens Apparate und Maschinen Gesellschaft mit beschränkter Haftung, Berlin, Germany, a corporation of Germany Application June 30, 1939, Serial No. 282,302
In Germany July 2, 1938

9 Claims. (Cl. 33—204)

The invention relates generally to inclination indicators for mobile vehicles and more particularly to gyroscopically actuated inclination indicators.

The invention concerns the indication of the angle of inclination of mobile vehicles such as aircraft through the intermediary of a Cardan mounted gyroscopic device or the like on the aircraft wherein two indicating members adjustable relative to each other in conformity with the turning of Cardan shafts, are so moved that the observer, for example the pilot, may appreciate the position and the oscillating movements of the aircraft.

For this purpose, there has been proposed heretofore several constructions. Particularly, it is known in aircraft horizons to arrange an indicating member, for example for the indication of the lateral inclination, directly on the ship's lengthwise arranged outer Cardan shaft, whilst the outer indicating member for example, that for the longitudinal inclination, is mechanically actuated through intermediary members from the inner Cardan shaft in such a way that in nosing down or nosing up of the aircraft, the indicating member correspondingly descends or rises. These mechanically adjusting connections between the inner Cardan shafts of the gyroscopic device and the indicating member for the longitudinal inclination, which may, for example, consist of a stirrup, are relatively complicated because the inner Cardan shafts are not fixed, but partake of the lateral inclination movements of the horizon.

Furthermore, with these mechanically adjusting connections, there is required, for the purpose of obtaining a logical indication of the longitudinal inclination movement, a reversing intermediary drive for reversing the longitudinal inclination movement of the gyroscopic device, since the inclination movement of the gyroscopic device relative to the aircraft is reversed with respect to the inclination movement of the aircraft with respect to the earth.

The device, according to the invention, permits of adaptation into a small housing on board aircraft and assures security of operation and furthermore renders unnecessary the utilization of expensive intermediary drives. Furthermore, for the actuation of the indicating device in correspondence with the angle of inclination about the inner Cardan shafts, a fixed auxiliary drive is provided, which is operable through a switching device that is adjustable from the inner Cardan shaft of the horizon device. There is thereby obtained a device which is very simple in construction and dependable in operation in so far as the gyroscope is relieved of the actuating couple necessary for displacing the indicating device.

Further advantages of the device as well as the constructional details thereof will appear from the following description, when taken in conjunction with the drawing, wherein the figure is a diagrammatic representation of one embodiment of the invention.

The housing or grimbal frame 1, in which a gyroscope having a vertical axis of rotation is mounted, is so hung through the intermediary of the inner Cardan shafts 2, the Cardan ring 3 and the outer Cardan shafts 4 disposed in fixed supports, that the outer shafts 4 are parallel to the longitudinal axis of the aircraft and the inner Cardan shafts 2 in horizontal position of the aircraft are parallel to the transverse axis of the aircraft. On a prolongation of the Cardan shaft 4, there is directly fixed the indicating member for the lateral inclination of the aircraft which, in the embodiment shown, consists of a half circular disc 6, the upper edge of which symbolizes the horizon. Instead of this half circular disc, there might be provided also a circular disc with a horizontal marking thereon or, for example, an imitation aircraft might be depicted thereon. In the embodiment illustrated, a stirrup 7 is utilized for the indication of the longitudinal inclination, which stirrup may move up and down with respect to the said disc 6 in conformity with the turning, which the inner Cardan shafts 2 execute in the Cardan 3, which turning corresponds to the angle of longitudinal inclination.

According to the invention, the adjustment of the stirrup takes place through an auxiliary drive 8 in the form of an electromagnetic torque developer or motor having a rotating winding or armature 8', which is controlled through a switching device operated by the gyroscope 1. The switching device in the embodiment illustrated consists of a tension distributing resistance, potentiometer or rheostat 9 affixed to the Cardan ring 3 and a contact arm 10 fastened to the inner Cardan shaft 2. The two halves of the tension distributing resistance are connected to a source of current 11' or 11". The conduction of current to the two windings of the rotating winding or armature 8' takes place in the embodiment selected, through springs 12 which, at the same time, serve to restrain the rotating winding or armature 8' in its zero or neutral position.

With the hook-up illustrated, the result is that, depending on whether the contact 10 is on one or the other halves of the tension distributor, the one or the other winding of the rotating winding or armature 8' is energized. The result is that this winding in the housing of the torque developer or motor 8 turns in one or the other direction against the force of the spring 12 and thereby corespondingly adjusts the indicating stirrup 7. Through a suitable graduation of the tension distributing resistance 9 and/or a suitable calibration of the restraining springs 12, the result is obtained that the longitudinal inclination about the Cardan shafts 2 is indicated to a greater scale adjacent zero or normal position of the indicator member 7, whilst as the indicator member moved farther away from zero or normal position due to greater nosing up or nosing down of the aircraft, the scale of indication more and more decreases. This result may also be obtained through a suitable construction of the magnets in the motor 8'.

An indication of the angle of longitudinal inclination to large scale, as long as the angle is still small, is desirable, since thereby the pilot can readily observe small longitudinal inclination of his aircraft.

It is ofttimes exceedingly desirable in inclined flight to be able to set on the indicating device a new desired position, which new position no longer corresponds to horizontal flight and subsequently obtain an indication to large scale of the withdrawal of the aircraft from this new desired inclined flight attitude. For this purpose the restraining springs 12 for the axis of rotation of the indicating stirrup 7 are operatively connected to a pinion 13 which, through the intermediary of a worm 14, rotatable through crank 15 with respect to an indicating device 16, is rotatable about a desired longitudinal inclination angle. 17 indicates a balance weight for the indicating stirrup 7.

With the device just described, the longitudinal inclination of the aircraft about the zero position selected by the hand wheel 15, will be indicated to an enlarged scale as long as the withdrawal of the aircraft from the desired inclined flight attitude is only slight. In case however the desired inclined flight attitude reaches a relatively large value, for example 40°, the stirrup need not necessarily be inclined 40°. It would be preferable in such cases, through a suitable selection of the spring 17 or suitable construction of the torque or motor developer 8 to obtain that without provision of an abutment the stirrup never goes beyond the indicated field of view of the horizon indicator.

What we claim is:

1. In a gyroscopic artificial horizon for aircraft, a gyro rotor, means mounting said rotor for spinning about a vertical axis and for angular movement about two mutually perpendicular horizontal axes, said mounting means comprising a gimbal frame and a Cardan ring, the Cardan ring being mounted for angular movement with the gyro rotor relative to the craft about the longitudinal axis thereof, means mounted for angular movement with the craft relative to said rotor about the transverse axis of said craft, an aircraft simulating member carried by and movable with said last-named means, a horizon simulating member carried by and movable with the Cardan ring and cooperating with said aircraft simulating member, a reversible motor for moving said means carrying said aircraft simulating member about an axis perpendicular to the longitudinal axis of the craft to move said aircraft simulating member up and down with respect to said horizon simulating member, and means controlled by relative angular movement between said Cardan ring and said gimbal frame upon angular movement of said craft about its transverse axis for energizing said motor for rotation in one direction or another to actuate said means carrying said aircraft simulating member, whereby said aircraft simulating member is moved up or down with respect to said horizon member correspondingly as the aircraft inclines upward or downward with respect to the real horizon.

2. In a gyroscopic artificial horizon for aircraft, a gyro rotor, means mounting said rotor for spinning about a vertical axis and for angular movement about two mutually perpendicular horizontal axes, said mounting means comprising a gimbal frame and a Cardan ring, the Cardan ring being mounted for angular movement with the gyro rotor relative to said craft about the longitudinal axis thereof, means mounted for angular movement with respect to the craft about the transverse axis of said craft, an aircraft simulating member carried by and movable with said last-named means, a horizon simulating member carried by and movable with said Cardan ring and cooperating with said aircraft simulating member, a reversible motor for moving said means carrying said aircraft simulating member about an axis perpendicular to the longitudinal axis of the craft to move said aircraft simulating member up and down with respect to said horizon simulating member, means controlled by relative angular movement between said Cardan ring and said gimbal frame upon angular movement of said craft about its transverse axis for energizing said motor for rotation in one direction or another to actuate said means carrying said aircraft simulating member, whereby said aircraft simulating member is moved up or down with respect to said horizon member correspondingly as the aircraft inclines upward or downward with respect to the real horizon, and means for returning said aircraft simulating member to normal position upon de-energization of said motor.

3. In a device of the kind described for a mobile vehicle, a gimbal frame pivoted about a horizontal axis perpendicular to the longitudinal axis of the vehicle, a gyro rotor pivoted in the gimbal frame for spinning about a vertical axis, a Cardan ring concentric with and mounting said gimbal frame therein and being angularly movable with said gyro rotor relative to the vehicle about the longitudinal axis thereof, a horizon indicating member carried by and movable with the Cardan ring, a stirrup concentric with said gimbal frame and said Cardan ring and pivoted at one end for movement about an axis parallel to the lateral axis of said vehicle, and an aircraft simulating member carried by and movable with said stirrup with respect to said horizon member, a reversible motor for displacing said stirrup about its pivotal axis, yielding means opposing the motor's operation, and means actuated upon relative angular movement by said gimbal frame and said Cardan ring for varying the energy applied to the motor.

4. In a device of the kind described for a mobile vehicle, a gimbal frame pivoted about a horizontal axis perpendicular to the longitudinal axis of the vehicle, a gyro rotor pivoted in the gimbal frame for spinning about a vertical axis, a Cardan ring concentric with and supporting said gimbal frame therein and movable with said gyro rotor relative to the vehicle about the longitudinal axis thereof, a horizon indicating member carried by and movable with said Cardan ring, a stirrup concentric with said gimbal frame and said Cardan ring and pivoted at one end for movement about an axis parallel to the lateral axis of the vehicle, an aircraft simulating member carried by and movable with said stirrup with respect to said horizon member, a reversible motor connected to displace said stirrup and said aircraft simulating member about their pivotal axis, yielding means resisting displacement of said stirrup and aircraft simulating member from its normal position, means actuated upon relative angular movement between the gimbal frame and the Cardan ring for varying the operating energy applied to the motor, and means for adjusting the initial resistance of the yielding means.

5. In a device of the kind described for a mobile vehicle, a gimbal frame pivoted about a horizontal axis perpendicular to the longitudinal axis of the vehicle, a gyro rotor pivoted in the gimbal frame for spinning about a vertical axis, a Cardan ring concentric with and supporting said gimbal frame therein and movable with said gyro rotor relative to said vehicle about the longitudinal axis thereof, a horizon indicating member carried by and movable with said Cardan ring, a stirrup concentric with said gimbal frame and said Cardan ring and pivoted at one end for movement about an axis parallel to the lateral axis of said vehicle, aircraft simulating means carried by and movable with said stirrup with respect to said horizon member, a reversible electric motor connected to displace said stirrup and said aircraft simulating member about their pivotal axis from their normal position, means for adjusting the initial resistance of the yielding means, and a potentiometer actuated by relative angular movement between the gimbal frame and the Cardan ring for varying the energy applied to the motor to operate it.

6. In a device of the kind described for a mobile vehicle, a gimbal frame pivoted about a horizontal axis perpendicular to the longitudinal axis of the vehicle, a gyro rotor pivoted in the gimbal frame for spinning about a vertical axis, a Cardan ring concentric with and mounting said gimbal frame therein and being angularly movable with said gyro rotor relative to the vehicle about the longitudinal axis thereof, a horizon indicating member carried by and movable with said Cardan ring, a stirrup concentric with said gimbal frame and said Cardan ring and pivoted at one end for movement about an axis parallel to the lateral axis of said vehicle, an aircraft simulating member carried by and movable with said stirrup with respect to said horizon member, a reversible electric motor connected to displace said stirrup and said aircraft simulating member about their pivotal axis, yielding means resisting displacement of said stirrup and aircraft simulating member from their normal position and serving as electrical leads to the motor, manually operated means for adjusting the initial position of said stirrup and said aircraft simulating member relative to said horizon indicating member and means actuated upon relative angular movement between the gimbal frame and the Cardan ring for varying the energy applied to the motor to operate it.

7. In a device of the kind described for a mobile vehicle, a gimbal frame pivoted about a horizontal axis perpendicular to the longitudinal axis of the vehicle, a gyro rotor pivoted in the gimbal frame for spinning about a vertical axis, a Cardan ring concentric with and mounting said gimbal frame therein and being angularly movable with said gyro rotor relative to the vehicle about the longitudinal axis thereof, a horizon indicating member carried by and movable with the Cardan ring, a stirrup concentric with said gimbal frame and said Cardan ring and pivoted at one end for movement about an axis parallel to the lateral axis of said vehicle, an aircraft simulating member carried by and movable with said stirrup with respect to said horizon member, a reversible motor connected to displace said stirrup and said aircraft simulating member about their pivotal axis, yielding means opposing the motor's operation, means for setting said stirrup and aircraft simulating member about their pivotal axis with respect to the horizon indicating member to correspond to a desired angle of inclined keel, and means actuated upon relative angular movement between the gimbal frame and the Cardan ring for varying the energy applied to the motor to operate it.

8. In a device of the kind described for a mobile vehicle, a gimbal frame pivoted about a horizontal axis perpendicular to the longitudinal axis of the vehicle, a gyro rotor pivoted in the gimbal frame for spinning about a vertical axis, a Cardan ring mounting said gimbal frame and said gyro rotor for angular movement about the longitudinal axis of said vehicle, means carrying an aircraft simulating member pivoted at one end for movement about an axis parallel to the lateral axis of the vehicle and adapted to be displaced with respect to a fixed reference defined by said gyro rotor according as the vehicle oscillates about its lateral axis, a reversible electric motor having a driving element for displacing the last-named means and the aircraft simulating member carried thereby about their pivotal axis, yielding means in the motor circuit opposing rotation of said driving element, and means actuated during relative movement of said gyro rotor and gimbal frame and said vehicle about its lateral axis for varying the energy applied to the motor to operate it.

9. An artificial horizon for aircraft, comprising a fixed support movable with the aircraft about the longitudinal and transverse axes thereof during rolling and pitching of the aircraft, a Cardan ring carried by said support and having horizontal outer Cardan shafts parallel to the longitudinal axis of the craft and horizontal inner Cardan shafts parallel to the transverse axis of the craft, a gimbal frame pivoted upon said inner shafts and a gyroscope carried by said frame for spinning about a vertical axis and for tilting movement about said outer and inner Cardan shafts, an indicator connected to one of said outer Cardan shafts for apparent tilting movement upon rolling of the aircraft and representing the horizon or datum, a cooperating indicator closely adjacent said first-named indicator and representing a normally horizontal position of the aircraft, means mounting said second-mentioned indicator for relative up and down movements with respect to said first-named indicator, electrically operated means for actuating said second-mentioned indicator for relative up and down movements, and means connected to one of said inner Cardan shafts and said Cardan ring for controlling said electrically-controlled means to actuate said second-mentioned indicator so that it moves up and down in the same sense as the aircraft moves with respect to the real horizon.

KURT JANN.
HEINRICH ROLAND.